United States Patent [19]

Hinman, Jr. et al.

[11] 4,057,841
[45] Nov. 8, 1977

[54] UNSUPERVISED TRIP KEYING FOR PHASE COMPARISON RELAYING APPARATUS

[75] Inventors: Walter L. Hinman, Jr., New Providence; Russell W. Gonnam, Morris Plains, both of N.J.

[73] Assignee: Westinghouse Electric Corporation, Pittsburgh, Pa.

[21] Appl. No.: 716,048

[22] Filed: Aug. 20, 1976

[51] Int. Cl.² ............................................. H02H 3/28
[52] U.S. Cl. ........................................ 361/64; 361/85
[58] Field of Search ................. 361/64, 66, 68, 81, 361/85

[56] References Cited

U.S. PATENT DOCUMENTS

| | | |
|---|---|---|
| 3,832,601 | 8/1974 | Hinman, Jr. et al. .................. 361/85 |
| 4,020,396 | 4/1977 | Gambale et al. ....................... 361/64 |

Primary Examiner—Harry E. Moose, Jr.
Attorney, Agent, or Firm—S. A. Seinberg

[57] ABSTRACT

Phase comparison relaying apparatus associated with the local and remote end terminals of a protected line section wherein the phase comparison is performed at one terminal by unsupervised circuitry to generate an echo trip signal which is employed to effect breaker tripping at the other terminal. Additional circuitry supervises the generation of a breaker trip signal for use at the terminal where the echo trip signal is generated without preventing generation and transmission of the echo trip signal.

The use of such circuitry is described in the operating context of phase comparison relaying apparatus adapted to utilize offset keying. Also described is the effectiveness of such circuitry during open breaker or zero-feed conditions.

4 Claims, 6 Drawing Figures

UNSUPERVISED TRIP KEYING FOR PHASE COMPARISON RELAYING APPARATUS

CROSS-REFERENCE TO RELATED APPLICATIONS

This application is related to United States Patent Application Ser. No. 548,135 filed on Feb. 7, 1975 in the names of W. L. Hinman, Jr. and R. W. Gonnam now U.S. Pat. No. 3,986,079. It is also related to U.S. Pat. No. 3,832,601 issued on Aug. 8, 1974 in the names of W. L. Hinman, Jr. and R. W. Gonnam; U.S. Pat. No. 3,882,361 issued on May 6, 1975 in the name of W. L. Hinman, Jr.; U.S. Pat. No. 3,893,008 issued on July 1, 1975 in the names of W. L. Hinman, Jr. and W. A. Strickland; and U.S. Pat. No. 3,898,531 issued on Aug. 8, 1975 in the name of W. L. Hinman, Jr. Also related in subject matter are United States Patent Application Ser. Nos. 548,130; filed on Feb. 7, 1975 in the name of K. K. Mustaphi, now U.S. Pat. No. 3,963,964, and 548,132 filed Feb. 7, 1975 in the names of J. C. Gambale and R. E. Ray, now abandoned in favor of continuations application Ser. No. 665,650 filed Mar. 10, 1976, now U.S. Pat. No. 4,020,396 and United States Patent Application Ser. No. 716,045, filed on Aug. 20, 1976 in the names of W. L. Hinman, Jr. and R. W. Gonnam. All of the foregoing are commonly assigned to the assignee hereof.

BACKGROUND OF THE INVENTION

This invention relates to protective relaying apparatus of the type which utilizes phase comparison techniques. More particularly, this invention relates to such relaying apparatus wherein the circuitry employed to perform the phase comparison is unsupervised and also generates an echo trip signal.

In prior art protective relaying apparatus, such as that disclosed in United States Application Ser. No. 548,135 and W. E. 46,197, an echo trip signal is generated for transmission to the remote end terminal of a protected line section whereat it aids in effecting remote tripping. In such prior art apparatus, however, the circuitry utilized to generate the echo trip signal dependent upon other circuitry which is supervised or logically inhibited by the output signals of fault and/or overcurrent detectors. Consequently, the echo trip signal is generated only when the supervisory logic permissives related to fault or overcurrent are satisfied.

Under certain operating conditions, where the breakers associated with each end terminal of the protected line section are both open and one is closed into an internal fault, a lack of fault or overcurrent will block the generation of the echo trip signal. Similarly, if both breakers are closed into an internal fault and a zero-feed condition exists at one end terminal, the generation of an echo trip signal will again be blocked. In either instance, the blocking action of the supervised circuitry will prevent breaker tripping due to the lack of an echo trip signal.

SUMMARY OF THE INVENTION

Accordingly, there is provided, in association with phase comparison relaying apparatus, unsupervised circuitry for making the phase comparison between signals related to local current conditions and a signal related to remote current conditions and for generating an echo trip signal whenever the phase comparison satisfies a predetermined relationship of the compared signals. Partial arming of the unsupervised circuitry may be utilized to insure that the signal related to remote conditions is a viable one.

Additional circuit means are provided for insuring that a local trip signal is generated only when an echo trip signal would be generated. The additional circuit means is also supervised by the output signals from locally associated fault and/or overcurrent detectors.

DESCRIPTION OF THE PREFERRED EMBODIMENT

Figure 1:
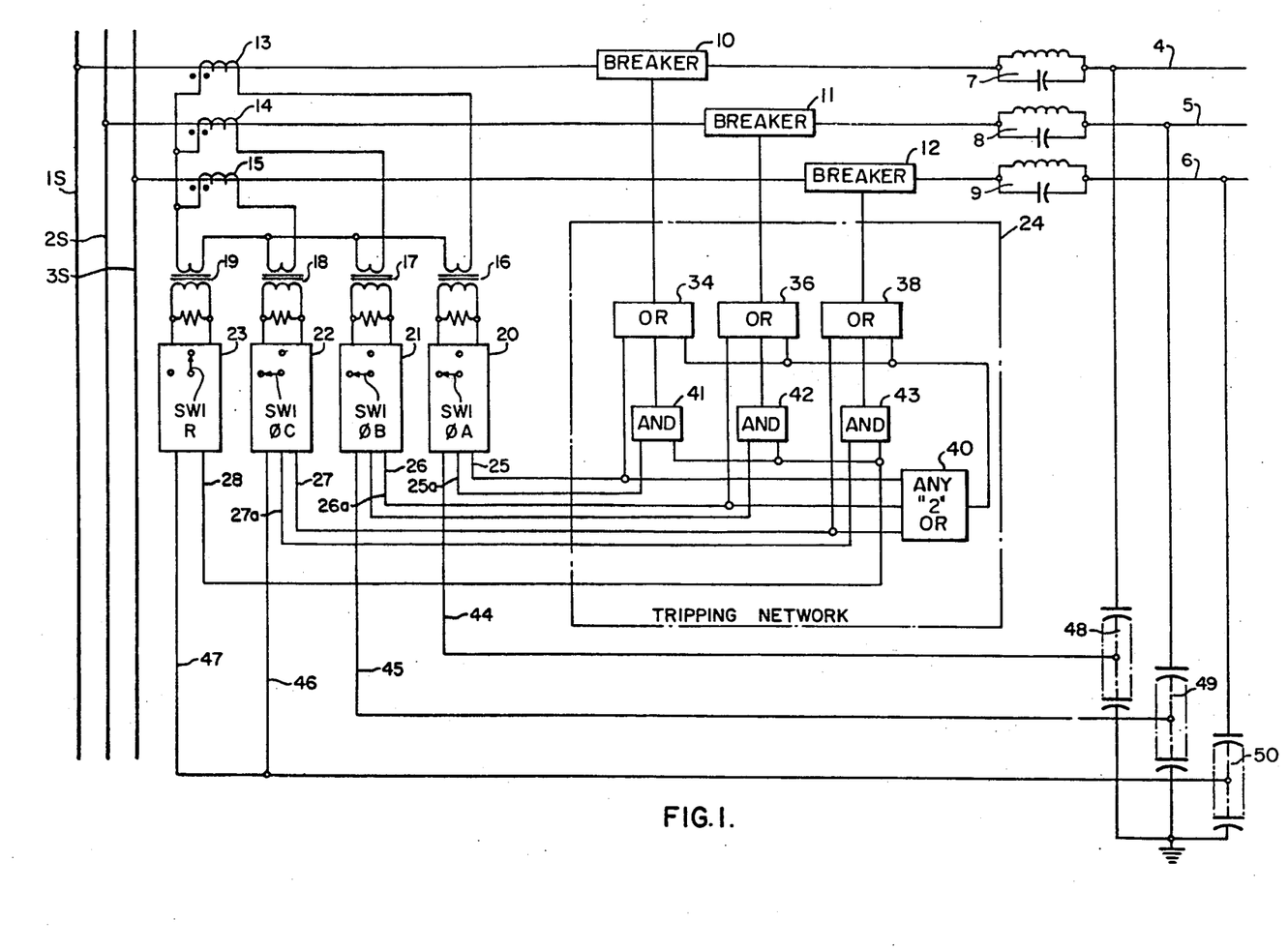
FIG. 1 is a block diagram illustrating relaying apparatus associated with one end terminal of a protected line section.

Referring now to the drawings wherein like reference characters are employed in the several views to identify like elements, FIG. 1 generally illustrates a block diagram of that portion of a segregated phase comparison relaying apparatus associated with one end of a protected power line section. It should be noted that while the present invention will be described hereinafter in connection with segregated phase comparison relaying apparatus employing offset keying, it may be used in conjunction with any phase comparison relaying apparatus such as, for example, segregated phase or mixed excitation.

Reference numerals 1S, 2S and 3S designate respectively the three busses at the illustrated end of the protected line section. These busses are supplied from a source (not shown) which for present purposes can be considered as strong. The busses 1S, 2S and 3S are connected to phase conductors 4, 5 and 6, respectively, through line traps 7, 8 and 9 and circuit breakers 10, 11 and 12. Current transformers 13, 14 and 15 are associated respectively with the phase conductors 4, 5 and 6 and are connected through the isolating current transformers 16, 17 and 18, respectively, to the phase relaying networks 20, 21 and 22. An isolating transformer 19 is connected to conduct the residual or ground current in the normal manner and it energizes the ground relaying network 23. The isolating transformers 16, 17, 18 and 19 energize loading resistors whereby voltage quantities having a magnitude that is proportional to the current in the conductors 4, 5 and 6 and the residual current respectively, are supplied to the networks 20, 21, 22 and 23.

The networks 20, 21, 22 and 23 are identical except that the residual network 23 has its switch SW1 in a position such that the fault current is detected by the $I_L$ overcurrent network 60 rather than by the fault detector 58.

The networks 20, 21 and 22 are each provided with output conductors 25, 26 and 27, respectively, which normally provide logical 0 signals to the OR gates 34, 36 and 38. These OR gates are connected to actuate the breakers 10, 11 and 12, respectively. In the event of the faulting of one or more of the conductors 4, 5 and 6, the corresponding network will be actuated to cause its output conductor 25, 26 or 27, as the case may be, to supply a logical 1 signal to and thereby, in turn, cause one or more of the OR gates 34, 36 or 38 to supply a logical 1 signal to trip the proper one or ones of the breakers 10, 11 or 12. The output conductors 25, 26 and 27 are also connected to input terminals of an ANY "2" OR gate 40, the output of which is connected to each of the OR gates 34, 36 and 38. Therefore, in the event of the faulting of two or more of the conductors 4, 5 and 6, all of the breakers 10, 11 and 12 will be actuated to disconnect the conductors from the busses 1S, 2S and 3S.

The networks 20, 21 and 22 are also provided with output conductors 25a, 26a and 27a, respectively, which are connected to a first input of the AND gates 41, 42 and 43, respectively. The second inputs to the AND gates 41, 42 and 43 are connected together from the output conductor 28 of the network 23. The detection of a ground or residual current fault by the network 23 provides a logical 1 signal on the conductor 28 and to the second input of each of the AND gates 41, 42 and 43. In the event a ground current fault occurs, one of the networks 20, 21 and 22 will also energize its output conductor 25a, 26a or 27a with a logical 1 signal and one of the AND gates 41, 42 and 43 will supply a logical 1 signal to one of the OR gates 34, 36 and 38 whereby one of the breakers 10, 11 and 12 will be energized to disconnect the faulted one of the conductors 4, 5 and 6.

Figure 2:
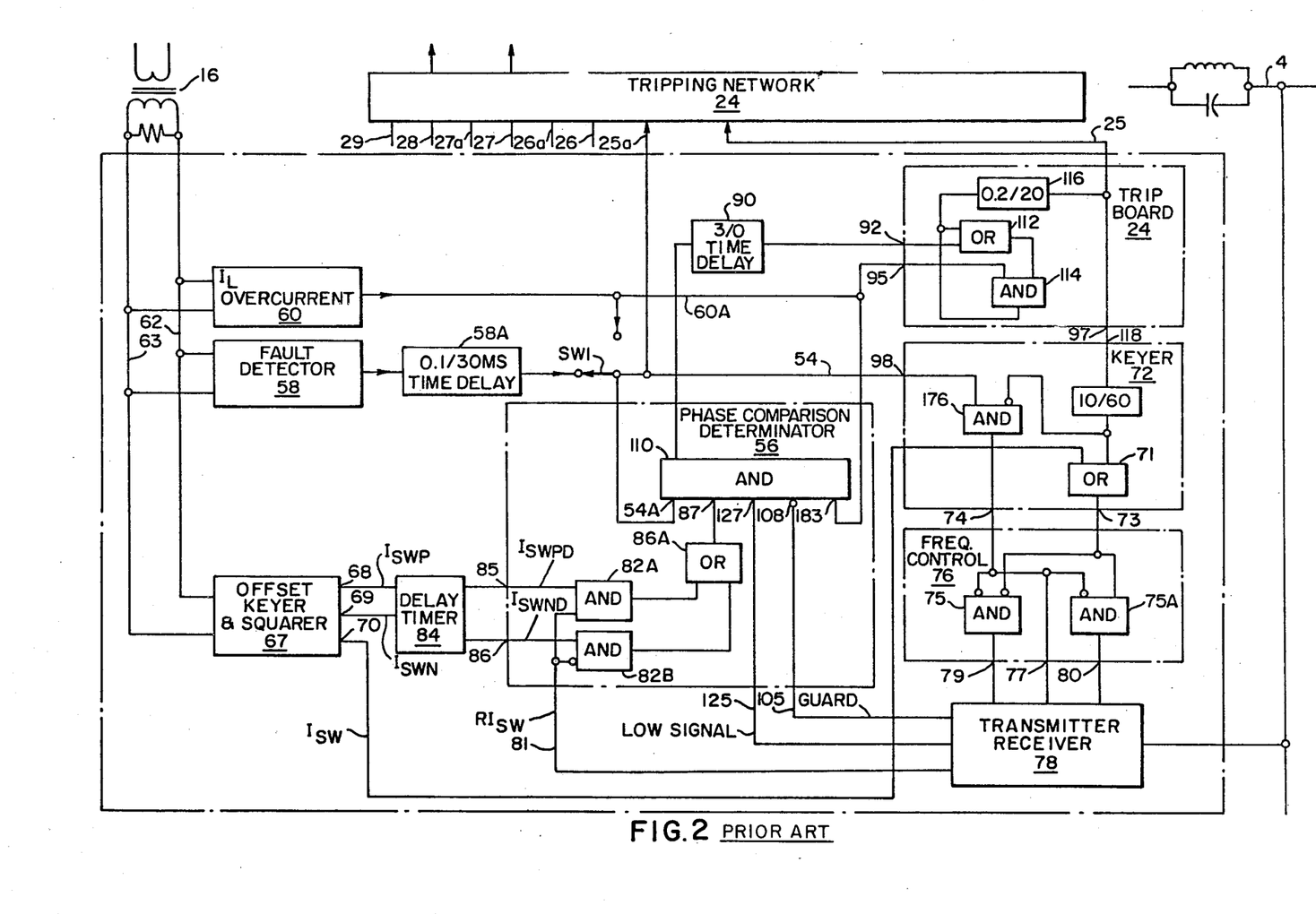
FIG. 2 is a block diagram showing portions of the associated relaying apparatus of FIG. 1, as implemented in the prior art, in greater particularity.

The network 20 is more completely shown in its prior art form in FIG. 2 and includes a fault detector 58 which provides a logical 1 output signal when it detects a fault on the conductor 4. This fault detector may take any of various suitable forms, one of which may be the fault detector shown and described in U.S. Pat. No. 3,654,516, issued on Apr. 4, 1972 to M. Traversi. The output of the fault detector 58 is connected through a time delay 58A and then via conductor 54 to one input terminal 54A of an AND gate 110 (the switch SW1 being in its illustrated position) and provides a first enabling signal to the AND gate 110.

An $I_L$ overcurrent network 60, energized from the busses 62 and 63, is connected by a conductor 60A to a second input terminal 183 of the AND gate 110. The overcurrent network 60 may take any suitable desired form in which a logical 1 signal will be provided whenever the input signal from the busses 62 and 63 represents a line current greater than a predetermined minimum current which, for example, may be the maximum expected charging current of the conductor 4. The conductor 60A is also connected to the input terminal 95 of the trip board 24a and therefrom to one input terminal of its AND gate 114. The output terminal of the AND gate 114 is connected through a timer 116 to the output conductor 25. With this arrangement, the trip board 24a can never supply a tripping signal to the tripping network 24 unless and until the $I_L$ overcurrent network 60 supplies a logical 1 signal thereto.

The transmitter-receiver 78, when it is receiving a signal from the remotely located transmitter-receiver (not shown) at the other end of the protected line section, of at least the proper magnitude, provides a logical 1 section to its output conductor 125 which is applied to a third input terminal 127 of the AND gate 110. If the transmitter-receiver 78 fails to receive a signal of sufficient strength, the resulting logical 0 signal on the input terminal 127 will prevent a logical 1 signal at the output of the AND gate 110. When the transmitter-receiver 78 is receiving a guard signal from the remote transmitter-receiver, a logical 1 signal will be supplied to its output conductor 105 and thereby to the NOT input terminal 108 of the AND gate 110. The AND gate 110 will therefore be enabled to provide an output signal only in the absence of the reception of a guard signal by the transmitter-receiver 78.

Under normal, non-fault conditions, no $RI_{SW}$ signal, the square wave signal transmitted from the remote location in response to current waveform signal excursions through the remote keying threshold level, will be supplied by the transmitter-receiver 78 over its output conductor 81 to the normal and NOT input terminals of the AND gates 82A and 82B, respectively. The $RI_{SW}$ signal comprises a series of alternating logical 1 and 0 signals indicating the instantaneous magnitude of the current in line 4, with reference to the keying threshold level, at the remote location. The AND gates 82A and 82B serve as current comparison devices for comparing the relative magnitude of the current at the remote end of the line as supplied to the conductor 81, with the relative magnitude of the current square waves derived from the current supplied locally through the transformer 16 to the offset keyer and squarer network 67, more fully described in the above-cited United States Patent Application No. 548,135 and W.E. 46,197. For the present, it is sufficient to state that a logical 1 signal will be supplied to the output conductor 68 of the offset keyer and squarer 67 during selected portions of the positive half-cycle of the signal between the busses 62 and 63 and a logical 0 signal will be supplied at its output conductor 69 during at least a portion of the positive half-cycle of the quantity between the conductors 62 and 63. These output signals are delayed in the usual manner by the delay timer 84 and are provided to the input terminals 85 and 86 of the phase comparison determinator 56 and therefrom to the normal input terminals of the AND gates 82A and 82B respectively.

When logical 1 signals are supplied concurrently to both of the input terminals of the AND gate 82A, the OR gate 86A will provide a logical 1 signal to that input terminal 87 of the AND gate 110. Similarly, when a logical 1 signal is supplied to the terminal 86 and a logical 0 signal is supplied concurrently by the conductor 81 to the AND gate 82B, a logical 1 output signal will also be supplied to the OR gate 86A, which also provides a logical 1 signal to the input terminal 87. However, in the absence of an enabling logical 1 signal at the input terminal 54A, and/or the presence of a logical 1 guard signal at the NOT input terminal 108, the AND gate 110 remains ineffective to provide any logical 1 output signals to the delay timer 90 to initiate its timing.

The offset keyer and squarer 67 provides an $I_{SW}$ signal on its output conductor 70 and therefrom to one input terminal of an OR gate 71 of the keyer 72. This $I_{SW}$ signal comprises a series of logical 1 and logical 0 signals as determined by the magnitude of the current signal supplied by the transformer 16 as compared to the keying threshold level at the local location. When $I_{SW}$ is a logical 1, OR gate 71 is enabled, setting output terminal 73 of the keyer 72 to a logical 1. This sets the normal input of AND gate 75A to a logical 1 and one of the NOT input terminals of AND gate 75 to a logical 0. Conversely, when $I_{SW}$ is a logical 0 and assuming that the timer 71A has not been actuated and timed out, the normal input to AND gate 75A is set to a logical 0 and the previously mentioned NOT input terminal of AND gate 75 is set to a logical 1.

In the absence of a fault, a logical 0 signal will be supplied over the conductor 54 to the input terminal 98 of the keyer 72 and therefrom to one NOT input terminal of the AND gate 176. The other NOT input terminal of the AND gate 176 is connected to the output of the 10/60 timer 71A which normally provides a logical 0 output signal. The AND gate 176, during non-fault operation, therefore provides a logical 1 signal through the output conductor 74 to NOT input terminals of the AND gates 75 and 75A of the frequency control 76. This logical 1 signal disables both of the AND gates 75 and 75A so that during non-fault operation, logical 0 output signals are supplied by the conductors 79 and 80 to the transmitter-receiver 78. The logical 1 signal, normally supplied by the AND gate 176, is conducted by output conductor 77 of the frequency control 76 to the transmitter-receiver 78 and functions as the guard signal.

The transmitter-receiver 78 may take any form in which it will transmit a guard signal in response to a logical 1 input signal on the conductor 77. It will also supply trip-positive and trip-negative signals in response to the alternating logical 1 and logical 0 signals on the conductors 79 and 80, which event occurs when a logical 0 signal is supplied to the output conductor 77 from the AND gate 176.

When a fault occurs on the conductor 4, a logical 1 signal will be supplied by the fault detector 58 to the input terminal 54A of the AND gate 110 and to the input terminal 98 of the keyer 72. When this occurs, the AND gate 176 provides a logical 0 signal to the conductor 77 and to the NOT input terminals of the AND gates 75 and 75A. At this same time, the $I_{SW}$ signal will be supplied to the OR gate 71, and the output conductor 73 of the keyer 72 will then respectively provide a series of logical 1 and logical 0 signals to the second NOT input terminal of the AND gate 75 and to the normal input terminal of the AND gate 75A, whereby the output conductors 79 and 80 will be sequentially energized by logical 1 and logiacl 0 signals. This, coupled with the logical 0 signal on conductor 77, causes the transmitter 78 to transmit as its $RI_{SW}$, the trip-positive and the trip-negative signals to the transmitter-receiver at the remote end of the protected line section.

Assuming that portions of the relaying apparatus associated with the remote location has detected the fault, and has interrupted its transmission of the guard signal and is transmitting its $RI_{SW}$ signal, the transmitter-receiver 78 will supply a logical 0 signal to the NOT input terminal 108 of the AND gate 110. Further assuming that the received signal is of sufficient strength, a logical 1 signal will be supplied to the input terminal 127 of the AND gate 110 and alternating logical 1 and logical 0 signals representing the quantity $RI_{SW}$ will be supplied to the AND gates 82A and 82B. If the fault is internal to the protected line section, the logical 1 signal of the $RI_{SW}$ quantity will occur concurrently with the logical 1 signal of the $I_{SWPD}$ quantity and the logical 0 signal of the $RI_{SW}$ quantity will occur concurrently with the logical 1 signal of the $I_{SWND}$ quantity. The logical 1 output signals from the AND gates 82A and 82B are supplied to the OR gate 86A and thereby to the input terminal 87 of the AND gate 110. The AND gate 110 being satisfied, supplies a logical 1 input signal, a breaker trip enabling signal, to the time delay 90 which immediately commences to time out.

If the logical 1 signal thereto exists for at least the 3 m.s. timing period, a logical 1 signal will be supplied by the time delay 90 through the input terminal 92 of the trip board 24a to one input terminal of the OR gate 112. The resulting logical 1 output of the OR gate 112 is supplied to the second input terminal of the AND gate 114 which, because of the logical 1 signal being supplied by the network 60, will supply a logical 1 input signal to the other input terminal of the OR gate 112 to maintain the AND gate 114 effective to continue logical 1 output to the input of the 0.2/20 m.s. timer 116. When the timer 116 times out, it supplies a logical 1 signal to the output conductor 25 and, via conductor 97, to the input terminal 118 of keyer 72. As discussed above and as will be apparent from FIG. 1, this logical 1 output signal is supplied to the OR gate 34 which thereupon supplies a logical 1 or tripping signal to the breaker 10 causing the breaker 10 to open and disconnect the conductor 4 from the bus 1S.

If the fault which occurred is a phase to ground fault, the network 23, which has its switch SW1 connected to utilize its $I_L$ overcurrent network 60 as a fault detector, would likewise "see" the fault and would apply a logical 1 output signal via its conductor 28 (which is equivalent to the conductor 25 of the network 20) to each of the AND gates 41, 42 and 43. With a phase A to ground fault, only the conductors 25a and 28 will have a logical 1 output signal and only AND gate 41 will provide a logical 1 signal to the OR gate 34 which serves as a backup arrangement for tripping the breaker 10. Similar breaker response would issue for the other possible phase-to-ground faults.

Assuming a phase A to phase B fault, the network 21 and the network 20 would "see" the fault and place logical 1 output signals on output conductors 25, 25a, 26 and 26a. The logical 1 output signal on conductor 26 supplies a logical 1 input signal to the OR gate 36 which thereupon supplies a logical 1 signal to trip the breaker 11 and the logical 1 signal on conductor 25 trips the breaker 10 as described. The breakers 10 and 11 are thereby actuated to disconnect the phase conductors 4 and 5 from the busses 1S and 2S, respectively.

The conductors 25 and 26 are also connected to the ANY "2" OR gate 40 which is effective when two logical 1 input signals are supplied thereto to supply a logical 1 output signal to each of the OR gates 34, 36 and 38 whereby the breaker 12 is tripped, as well as the breakers 10 and 11. This actuation of the breaker 12, even though the line 6 is not faulted, is usually desirable to maintain system stability. Similar breaker response would ensue for the other possible phase-to-phase faults.

When timer 116 has timed out, a logical 1 signal, as previously mentioned, is forwarded to the tripping network 24. In addition, as previously noted, a logical 1 signal is forwarded to timer 71A of the keyer 72. When timer 71A times out, it forwards a logical 1 signal to one NOT input of AND gate 176 and to one input of OR gate 71. As a result, the output terminals 73 and 74 of keyer 72 are set to a logical 1 and a logical 0, respectively. This enables AND gate 75A and disables AND gate 75. Thus, when the relaying apparatus at the illustrated end portion of the protected line section trips its associated breaker, inputs 77 and 79 to the transmitter-receiver 78 are held at a logical 0 while input 80 is held at a steady logical 1. In other words, in response to a tripping signal, the transmitter-receiver 78 transmits a steady trip-positive or steady positive $RI_{SW}$ signal hereinafter referred to as the echo trip signal.

When the echo trip signal is received at the other end of the protected line section, it is compared by AND gates 82A and 82B to the local positive and negative square waves. As soon as the local positive square wave exceeds its threshold level for at least 3 m.s., a local trip is initiated as described above. Thus, the echo trip signal is employed to effect tripping at one terminal of a protected line section when conditions there would not have otherwise opened an associated breaker.

Thus far discussed, the operation of the relaying apparatus illustrated in FIGS. 1 and 2 is substantially identical to that described in the above-identified United States Patent Application No. 548,135 and W.E. 46,197. In the apparatus described therein, either offset or modified offset keying is employed. The present invention will be described in the context of relaying apparatus adapted for offset keying, but it will be appreciated that this choice is an arbitrary one and that the present invention is not so limited being applicable to any phase comparison relaying apparatus which utilizes offset or modified offset keying. Thus the present invention may be used in conjunction with segregated phase or mixed excitation phase comparison with two or three terminal lines.

Figure 3:
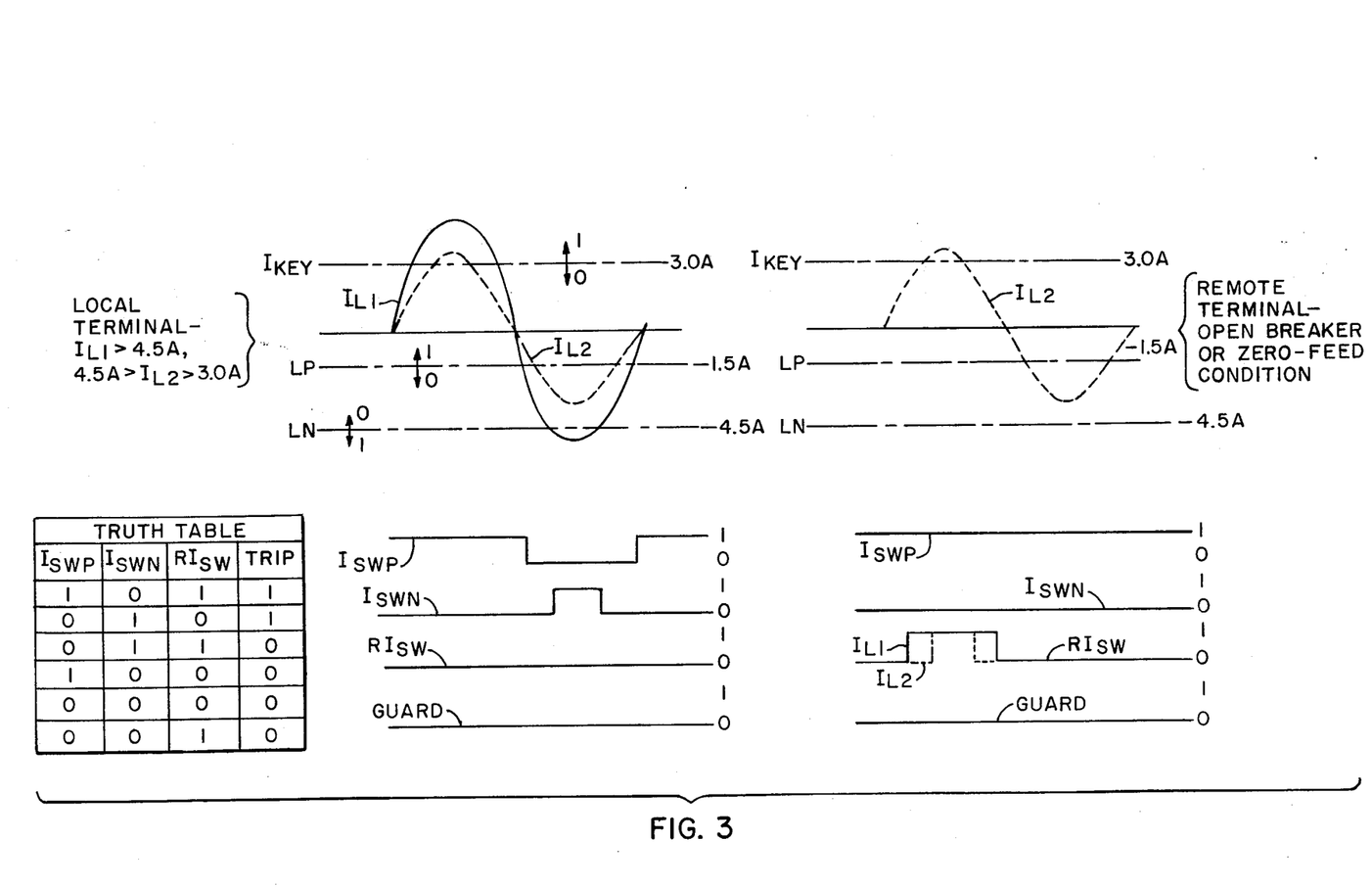
FIG. 3 depicts the fault current waveforms of the FIG. 2 arrangement at the local and remote ends of the protected line section and the corresponding logic signals generated by the associated relaying apparatus.

FIG. 3 illustrates an arbitrary set of local and remote keying threshold levels for relaying apparatus wherein the various threshold levels have been offset from the effective zero axis of the secondary fault current waveform. Such offset threshold levels are obtained by making appropriate adjustments to the offset keyer and squarer network 67 which forms a part of the relaying apparatus associated with each conductor at each end terminal, local or remote, of the protected line section. A more detailed description of such adjustments will be found in the above-referenced United States Patent Application No. 548,135 and W.E. 46,197.

If the breakers associated with the local and remote end terminals of the protected line section are open initially and the local breaker 10 is closed into an internal fault, i.e., a line test is made, FIG. 3 shows that at least 4.5 amperes of secondary fault current, $I_{L1}$, must flow at the local end in order to initiate a trip. That a local trip will occur under such a condition of current flow can be shown by reference to FIG. 2, FIG. 3, particularly the square wave curves and truth table thereof, and the following description.

Assuming that FIG. 2 shows the relaying apparatus associated with the remote end terminal of the protected line section, the open breaker sensor 93, due to the open breaker condition at the remote end, generates a logical 1 signal which disables AND gate 176 setting its output, on terminal 74, to a logical zero. This action sets the guard signal at terminal 77 to a logical 0 and also partially arms AND gates 75 and 75A. However, since there is zero current flow at the remote end, $I_{SW}$ will be a logical 0 and OR gate 71, in the expected absence of a trip signal to the timer 71A, will be held in a disabled state. As a result, only AND gate 75 will be enabled and the remote transmitter-receiver 78 will send a steady trip-negative signal to the local transmitter-receiver 78 which is adapted to interpret this as a logical 0 signal for the quantity $RI_{SW}$.

With the remote terminal keying a steady trip-negative signal, the $RI_{SW}$ for the local terminal as shown in FIG. 3, the local terminal is tripped during the second-half cycle of current flow when $RI_{SW}$ is a logical 0 and $I_{SWN}$ is coincidentally a logical 1. It is assumed that $I_{SWN}$ remains a logical 1 for the 3 m.s. timing period necessary to time out timer 90 and thereby activate trip board 24a.

If less than 4.5 amperes of secondary fault current flows at the local terminal, then $I_{SWN}$ will not be set to a logical 1 and the local breaker 10 will not be tripped. It should be noted that for local fault current magnitudes between the keying threshold value and the threshold value for generating the local negative square wave, in this instance 3.0 and 4.5 amperes respectively $I_{L2}$ in FIG. 3, a trip-positive or logical 1 signal will be keyed to the remote terminal. Under ordinary fault conditions, this signal when compared to the remote current square waves will produce a remote trip signal. As noted above, this will cause the remote transmitter-receiver 78 to transmit a steady trip-positive or echo trip signal back to the local terminal. Upon receipt at the local terminal, the echo trip signal will effect local trip as soon as the local $I_{SWP}$ threshold level is exceeded for more than 3 m.s.

Figure 4:
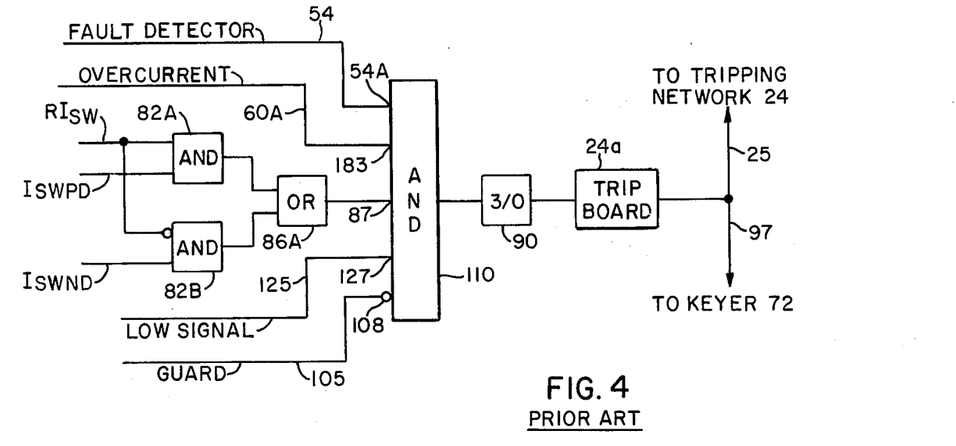
FIG. 4 illustrates in simplified form the block diagram of the prior art relaying apparatus shown in FIG. 2.

However, under the prior art arrangement shown in FIG. 3 and a simplified version thereof which is shown in FIG. 4, the generation of an echo trip signal is blocked by the requirement that AND gate 110 be armed by appropriate logic signals on its input terminals 54A and 183, which are fed respectively by the outputs of fault detector 48 and overcurrent detector 60. With an open breaker at the remote terminal, there is no current flow, both the fault detector 58 and overcurrent detector 60 hold the control busses 54 and 60A at a logical 0 and, consequently, AND gate 110 is inhibited. This prevents the flow of a logical 1 signal to trip board 24a and, as explained above, will block the generation of an echo trip signal. Thus, under an open breaker condition, echo tripping will be prohibited and the open terminal transmitter-receiver 78 will continue to key a steady trip-negative signal which will be ineffective to cause tripping at the closed breaker terminal which experiences secondary fault current flow, $I_{L2}$ for example, lesser in absolute magnitude than the local negative threshold level.

In a similar vein when line 4 is not carrying watts or vars for example, a zero feed condition will be present when both the local and remote breakers are closed into an internal fault. Under the prior art arrangement depicted in FIGS. 2 and 4, AND gate 110 will not be appropriately armed since for zero current flow the outputs of fault detector 58 and overcurrent detector 60 will again be a logical zero. Thus, as was the case for the open breaker condition, trip board 24a will remain disabled and fail to forward a logical 1 signal to keyer 72 thereby preventing generation of an echo trip signal.

Figure 5:
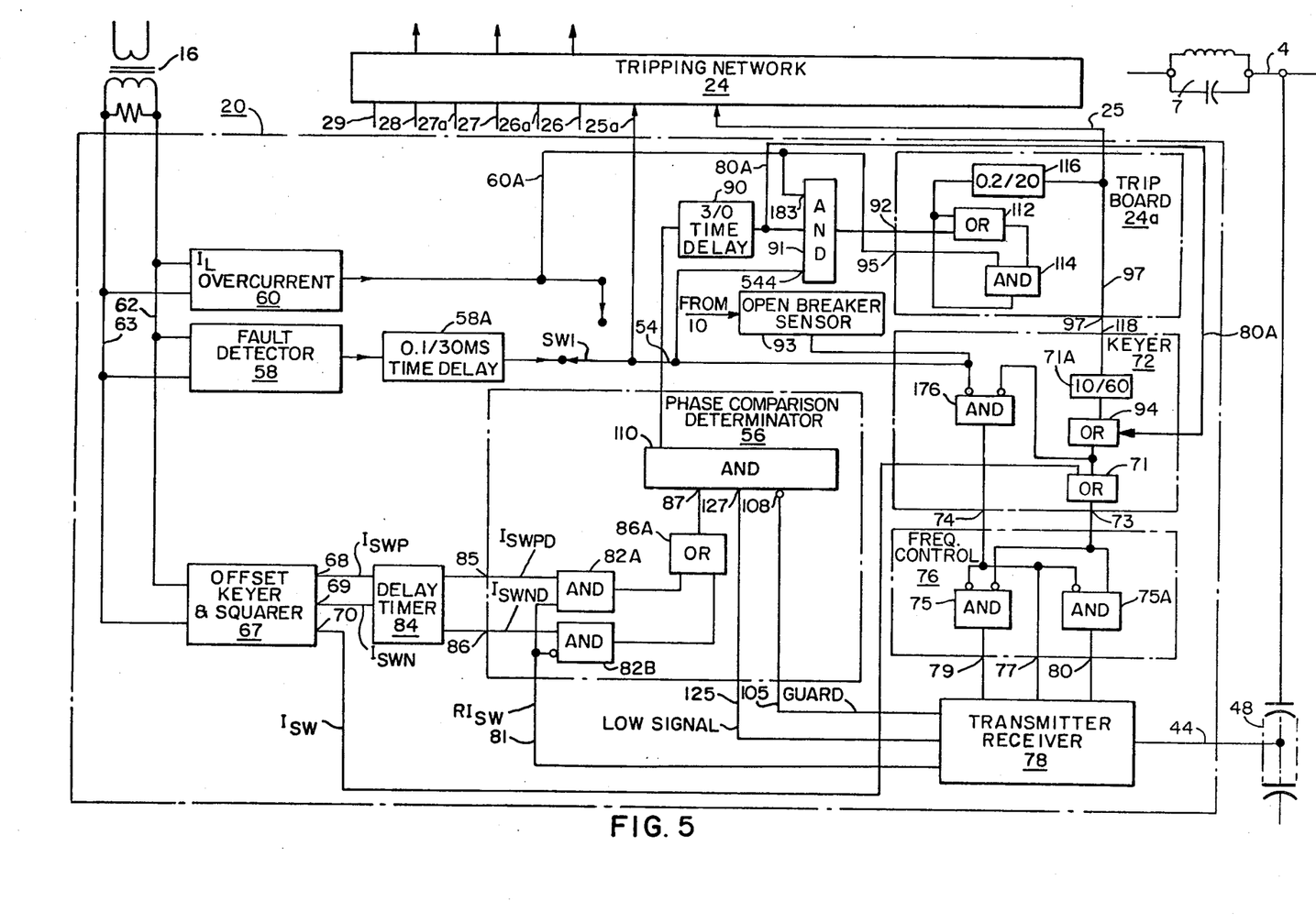
FIG. 5 is a block diagram showing portions of the associated relaying apparatus of FIG. 1 embodying the present invention.
Figure 6:
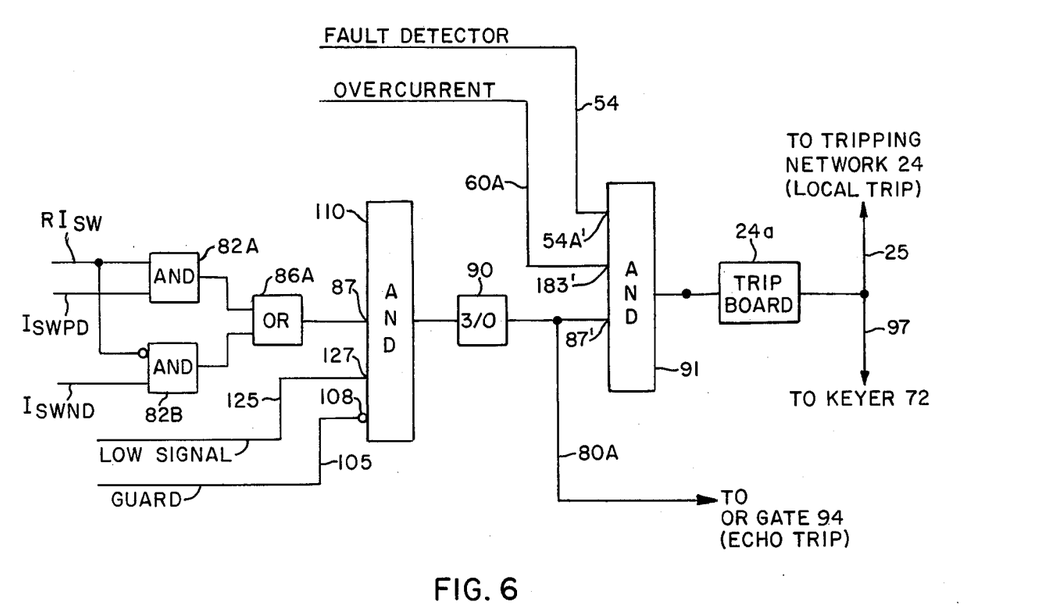
FIG. 6 illustrates in simplified form the block diagram of the relaying apparatus shown in FIG. 5.

In the present invention, as shown in detailed fashion in FIG. 5 and in simplified from in FIG. 6, the problem of blocking of the echo trip signal is overcome by making unsupervised phase comparisons. As is most clearly illustrated in FIG. 6, the local square waves, $I_{SWP}$ and $I_{SWN}$, developed by the offset keyer and squarer 67 are compared by the AND gates 82A and 82B to the remotely keyed square wave, $RI_{SW}$, as was done in the prior art arrangement. However, in the present invention, AND gate 110 is not armed or supervised by the fault and overcurrent detectors 58 and 60.

Instead, AND gate 91 is placed intermediate the AND gate 110 and the trip board 24a and the outputs of the fault detector 58 and the overcurrent detector 60 are connected to its input terminals 54A' and 183'. It should be noted that timer 90 continues to serve its original function. Now when a phase comparison is made by gates 82A, 82B and 86A, which results in a logical 1 signal being applied to input terminal 87 of AND gate 110, assuming the lack of guard signal and an RI$_{SW}$ of sufficient strength, the output of AND gate 110 will be set to a logical 1. This initiates the timing out of timer 90 and after the appropriate period, 3 m.s. in this case, the third input terminal 87' of AND gate 91 is set to a logical 1. Simultaneously, control bus 80A is also set to a logical 1.

If the relaying apparatus shown in FIGS. 5 and 6 were being utilized under the open breaker or zero feed conditions, the lack of a logical 1 signal on input terminals 54A' and 183' would prevent AND gate 91 from actuating trip board 24a. Under the prior art arrangement, generation of an echo trip signal would thereby be prevented. In the present invention, however, the fact of a phase comparison is transmitted by control bus 80A, which is thereby set to a logical 1, to OR gate 94.

A logical 1 signal on control bus 80A sets the output of OR gate 94 to a logical 1 and likewise does the same to the output of OR gate 91 to which the output terminal of OR gate 94 is connected. The output terminal of OR gate 94 is also connected to one of the NOT input terminals of AND gate 176 and, when set to a logical 1, causes the output of AND gate 176 to be set to a logical zero. This, in turn, sets the guard signal to zero and partially arms AND gates 75 and 75A. When the output of OR gate 94 was set to a logical 1, it also sets the normal input to AND gate 75A to a logical 1 which now fully enables AND gate 75A and causes a logical 1 to be maintained on terminal 80, the echo trip signal, for as long as phase comparison coincidence occurs.

Thus, as is best shown in FIG. 6, tripping at the associated end of the protected line section is still accomplished under supervised logic conditions; that is, both a fault or overcurrent condition is a necessary prerequisite to trip board 24a operation. However, the presence of a phase comparison coincidence which would have been insufficient under the prior art to effect remote trip through the use of the echo trip signal is now rendered sufficient for such a purpose.

What is claimed and is desired to be secured by Letters Patent is as follows:

1. In phase comparison relaying apparatus for protecting an alternating current power transmission line including at least one conductor interconnected by circuit breaker means at its local and remote end terminals between first and second busses, the improvement comprising:
   a. first circuit means, cooperatively associated with one end terminal of the conductor, adapted to receive signals representative of current flow in the conductor at both of its end terminals, for comparing said signals and for generating a breaker trip enabling signal whenever the received signals have a predetermined relationship;
   b. second circuit means, adapted to receive said trip enabling signal, for forwarding said trip enabling signal to the associated interconnecting circuit breaker means, said second circuit means being further adapted to receive at least one arming signal representative of an undesirable current condition in the conductor and to inhibit forwarding of said trip enabling signal only in the absence of said arming signal; and
   c. third circuit means also adapted to receive said breaker trip enabling signal for forwarding said breaker trip enabling signal to the non-associated end terminal of the conductor.

2. The relaying apparatus according to claim 1, wherein said arming signal is representative of a fault condition in the conductor.

3. The relaying apparatus according to claim 1, wherein said arming signal is representative of an overcurrent condition in the conductor.

4. The relaying apparatus according to claim 1, wherein said second circuit means is adapted to receive two arming signals and is inhibited only in the absence of both of said arming signals, one of said arming signals being representative of a fault condition in the conductor and the other being representative of an overcurrent condition in the conductor.

* * * * *